US012687960B2

(12) United States Patent
Raj et al.

(10) Patent No.: US 12,687,960 B2
(45) Date of Patent: Jul. 21, 2026

(54) SYSTEM AND METHOD FOR OPTIMIZING MEMORY UTILIZATION IN A DISTRIBUTED FILE SYSTEM

(71) Applicant: Visa International Service Association, San Francisco, CA (US)

(72) Inventors: Satyam Raj, Bengaluru (IN); Shivam Mohan, Eldeco City (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/897,755

(22) Filed: Sep. 26, 2024

(65) Prior Publication Data

US 2026/0086714 A1 Mar. 26, 2026

(51) Int. Cl.
*G06F 3/06* (2006.01)

(52) U.S. Cl.
CPC ............ *G06F 3/0608* (2013.01); *G06F 3/064* (2013.01); *G06F 3/0673* (2013.01)

(58) Field of Classification Search
CPC ....... G06F 3/0608; G06F 3/064; G06F 3/0673
See application file for complete search history.

(56) References Cited

U.S. PATENT DOCUMENTS

2019/0188079 A1* 6/2019 Kohli .................. G06F 11/1076
2021/0326047 A1* 10/2021 Sillifant .............. G06F 11/2028

* cited by examiner

*Primary Examiner* — Francisco A Grullon
(74) *Attorney, Agent, or Firm* — K&L Gates LLP

(57) ABSTRACT

A method for optimizing memory utilization in a distributed file system is disclosed. The method includes receiving a write request to store a data chunk in at least one node of a plurality of nodes and monitoring memory usage of a data set across the plurality of nodes in the distributed file system. The data set is partitioned into a plurality of data blocks across the plurality of nodes. The method includes determining a current state of data block replications across the plurality of nodes, selecting a target node to store the data chunk, and dynamically adjusting selection of the target node based on historical write request patterns according to a reinforcement learning model.

13 Claims, 9 Drawing Sheets

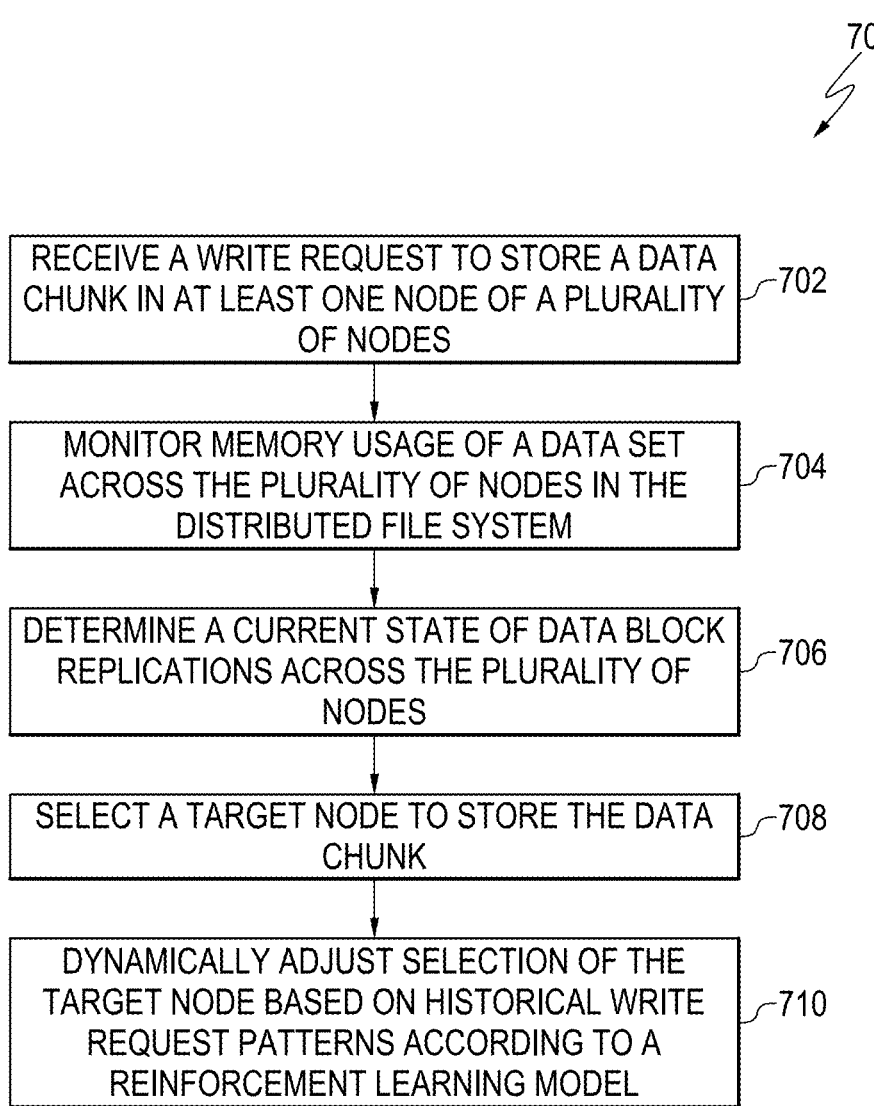

700

RECEIVE A WRITE REQUEST TO STORE A DATA CHUNK IN AT LEAST ONE NODE OF A PLURALITY OF NODES ⟋702

MONITOR MEMORY USAGE OF A DATA SET ACROSS THE PLURALITY OF NODES IN THE DISTRIBUTED FILE SYSTEM ⟋704

DETERMINE A CURRENT STATE OF DATA BLOCK REPLICATIONS ACROSS THE PLURALITY OF NODES ⟋706

SELECT A TARGET NODE TO STORE THE DATA CHUNK ⟋708

DYNAMICALLY ADJUST SELECTION OF THE TARGET NODE BASED ON HISTORICAL WRITE REQUEST PATTERNS ACCORDING TO A REINFORCEMENT LEARNING MODEL ⟋710

FIG. 7

SYSTEM AND METHOD FOR OPTIMIZING MEMORY UTILIZATION IN A DISTRIBUTED FILE SYSTEM

TECHNICAL FIELD

This disclosure pertains to the technical field of memory optimization within distributed file systems.

SUMMARY

An embodiment includes a method for optimizing memory utilization in a distributed file system. The method includes receiving a write request to store a data chunk in at least one node of a plurality of nodes. Monitoring memory usage of a data set across the plurality of nodes in the distributed file system, wherein the data set is partitioned into a plurality of data blocks across the plurality of nodes. Determining a current state of data block replications across the plurality of nodes. Selecting a target node to store the data chunk. Dynamically adjusting selection of the target node based on historical write request patterns according to a reinforcement learning model.

In one aspect, the method includes migrating data blocks from nodes with memory usage exceeding a predefined threshold to nodes with available memory below the predefined threshold.

In another aspect, which can be combined with one or more previously recited aspects, the method includes rebalancing a distribution of data blocks to provide optimal memory utilization across the plurality of nodes.

In another aspect, which can be combined with one or more previously recited aspects, dynamically adjusting a selection of a target node includes selecting a node with minimal memory space that is sufficient to accommodate a data block and minimize wasted memory space.

In another aspect, which can be combined with one or more previously recited aspects, dynamically adjusting a selection of a target node includes selecting a node with maximum memory space to provide a larger remainder of unused memory space for future use.

In another aspect, which can be combined with one or more previously recited aspects, dynamically adjusting a selection of a target node includes selecting a first node that has sufficient memory space to accommodate a data block and minimizing time taken to find a suitable node to store the data chunk.

In another aspect, which can be combined with one or more previously recited aspects, the method includes determining an optimal set of target nodes for the block replacement operation based on a best fit algorithm and selecting a source node with minimal space sufficient to accommodate a data block to minimize wasted space.

In another aspect, which can be combined with one or more previously recited aspects, the method includes determining an optimal set of target nodes for the block replacement operation based on a worst fit algorithm and selecting a source node with maximum space to leave a larger remainder for future use.

In another aspect, which can be combined with one or more previously recited aspects, the method includes determining an optimal set of target nodes for the block replacement operation based on a first fit algorithm and selecting a first node that has sufficient space to accommodate a data block to minimize time taken to find a suitable node.

Another embodiment includes a system for optimizing memory utilization in a distributed file system. The system includes a control node and an intelligent coordination unit (ICU) to communicate with the control node. The ICU includes a source node selector, a target node selector, and a block replacement executor. The source node selector selects a source node based on a write request from the control node. The write request includes a write request in a contiguous storage space of size R chunked into one or more than one C sized unit of contiguous storage space. The target node selector determines an optimal set of target nodes based on the selected source node and to free up storage space in a storage block/unit where replacement will occur. The block replacement executor replaces storage blocks/units based on the source node, the target node, and blocks as inputs and to free up required storage space in the selected source node to persist the C sized unit of contiguous storage space.

In one aspect, the source node selector is configured to select an optimal source node for a write operation to minimize the number of block replacement operations block/unit replacement executor.

In another aspect, which can be combined with one or more previously recited aspects, the source node selector is configured to dynamically adapt to less optimal source nodes choices for certain write requests based on a reinforcement learning model configured to learn based on a previous experience and historical write request patterns.

In another aspect, which can be combined with one or more previously recited aspects, the target node selector is configured to determine an optimal set of target nodes for the block replacement operation based on a best fit algorithm to select a source node with minimal space sufficient to accommodate a data block to minimize wasted space.

In another aspect, which can be combined with one or more previously recited aspects, the target node selector is configured to determine an optimal set of target nodes for the block replacement operation based on a worst fit algorithm to select a source node with maximum space to leave a larger remainder for future use.

In another aspect, which can be combined with one or more previously recited aspects, wherein the target node selector is configured to determine an optimal set of target nodes for the block replacement operation based on a first fit algorithm to select first node that has sufficient space to accommodate a data block to minimize time taken to find a suitable node.

In another aspect, which can be combined with one or more previously recited aspects, the target node selector is configured to dynamically adjust a selection strategy based on historical write request patterns using a reinforcement learning model to choose a selection algorithm and adapt to changing system usage patterns and optimize for memory utilization.

Another embodiment includes a system for optimizing memory utilization in a distributed file system. The system includes a processor and a non-transitory computer-readable medium coupled to the processor. The non-transitory computer-readable medium storing instructions that, when executed by a processor, cause the processor to receive a write request to store a data chunk in at least one node of a plurality of nodes, monitor memory usage of a data set across the plurality of nodes in the distributed file system, wherein the data set is partitioned into a plurality of data blocks across the plurality of nodes, determine a current state of data block replications across the plurality of nodes, select a target node to store the data chunk, and dynamically adjust selection of the target node based on historical write request patterns according to a reinforcement learning model.

In one aspect, the non-transitory computer-readable medium stores additional instructions that, when executed by the processor, cause the processor to migrate data blocks from nodes with memory usage exceeding a predefined threshold to nodes with available memory below the predefined threshold.

In another aspect, which can be combined with one or more previously recited aspects, the non-transitory computer-readable medium stores additional instructions that, when executed by the processor, cause the processor to rebalance a distribution of data blocks to provide optimal memory utilization across the plurality of nodes.

In another aspect, which can be combined with one or more previously recited aspects, the non-transitory computer-readable medium stores additional instructions that, when executed by the processor, cause the processor to determine an optimal set of target nodes for the block replacement operation based on a best fit algorithm and selecting a source node with minimal space sufficient to accommodate a data block to minimize wasted space, determine an optimal set of target nodes for the block replacement operation based on a worst fit algorithm and selecting a source node with maximum space to leave a larger remainder for future use, determine an optimal set of target nodes for the block replacement operation based on a first fit algorithm and selecting a first node that has sufficient space to accommodate a data block to minimize time taken to find a suitable node.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
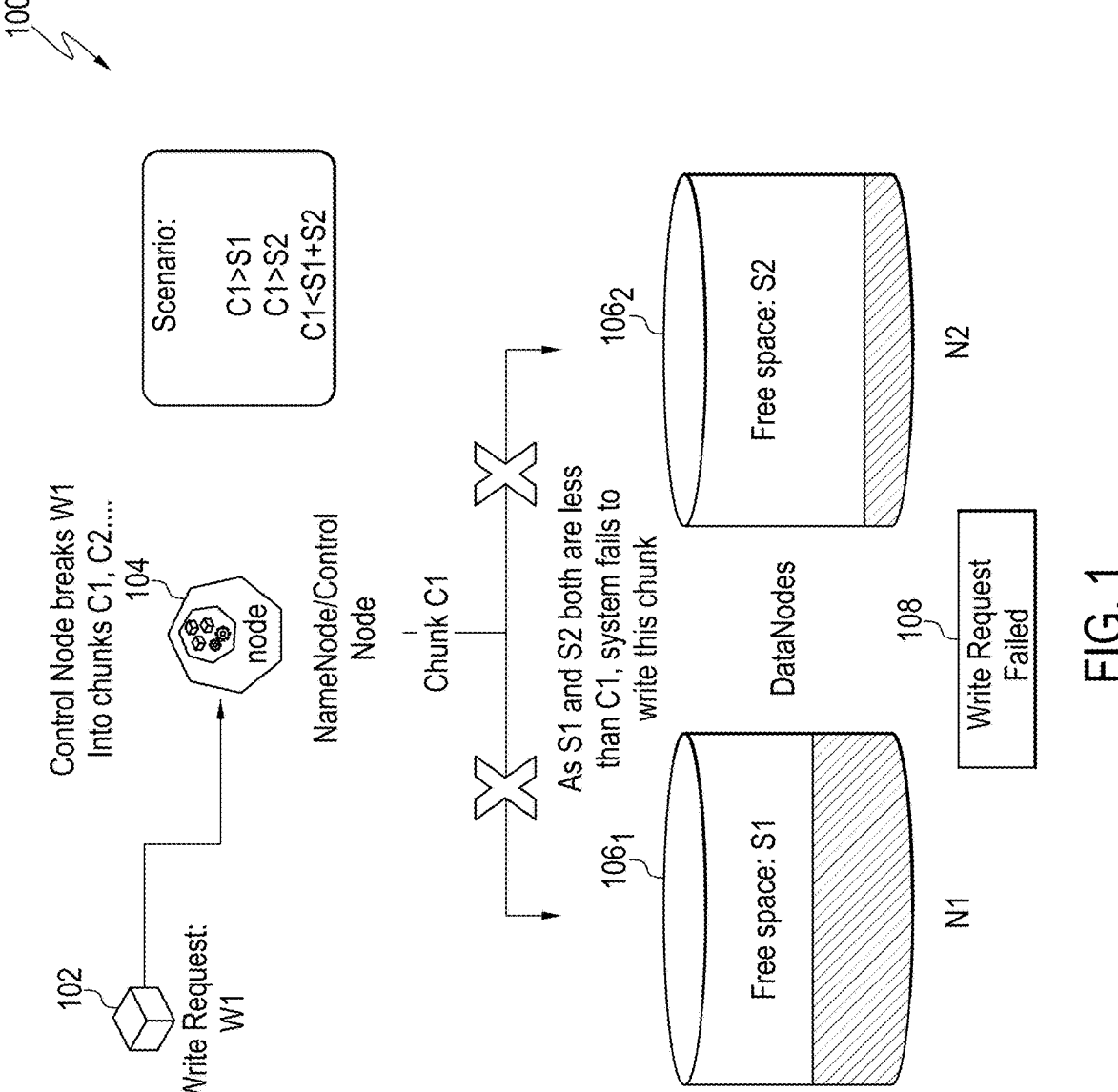

The system and method disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 depicts an illustrative architecture showcasing sub-optimal memory utilization commonly encountered in conventional distributed file systems.

Figure 2:
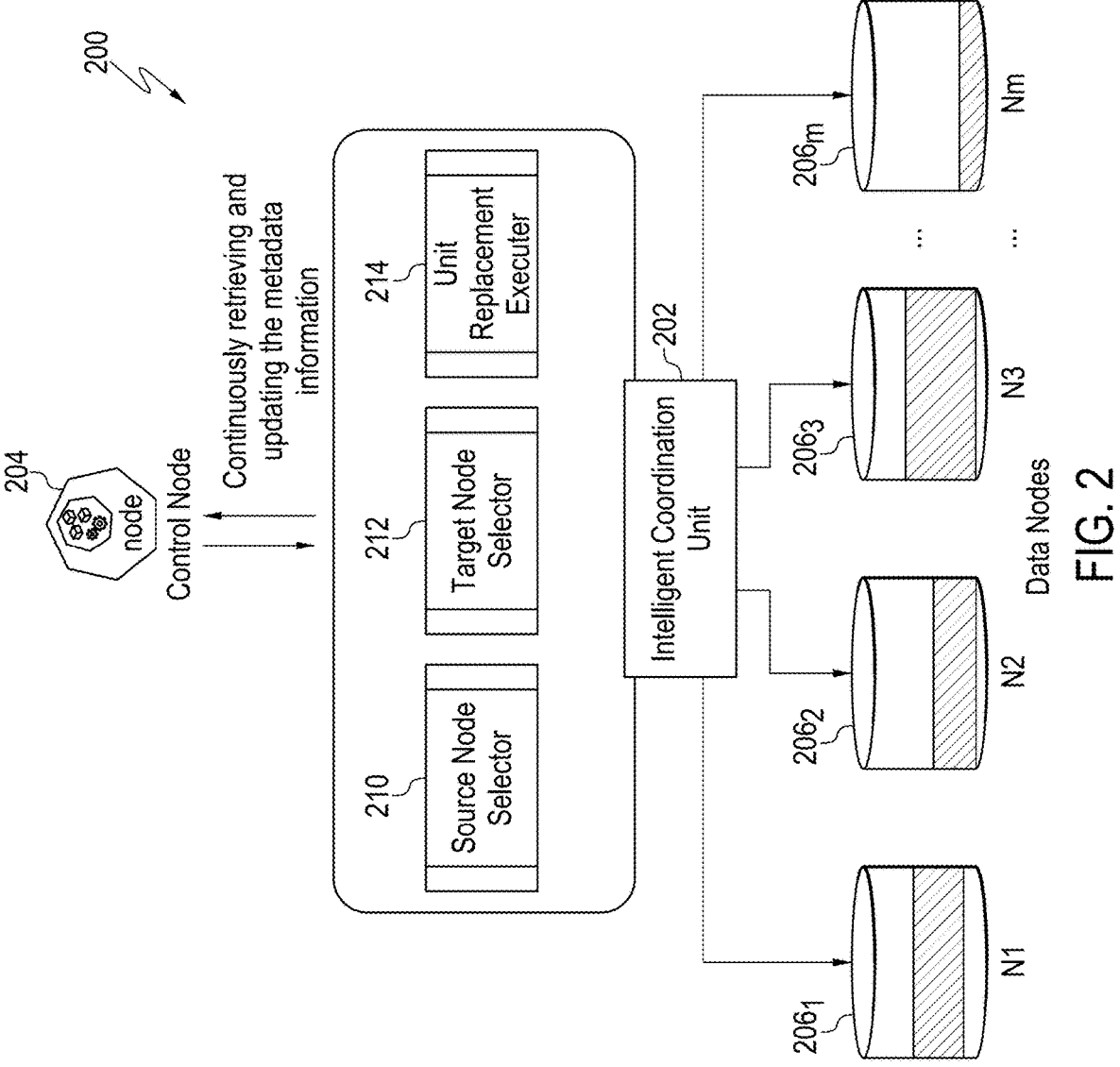

FIG. 2 depicts an illustrative architecture employing an intelligent coordination unit (ICU), according to at least one aspect of the present disclosure.

Figure 3:
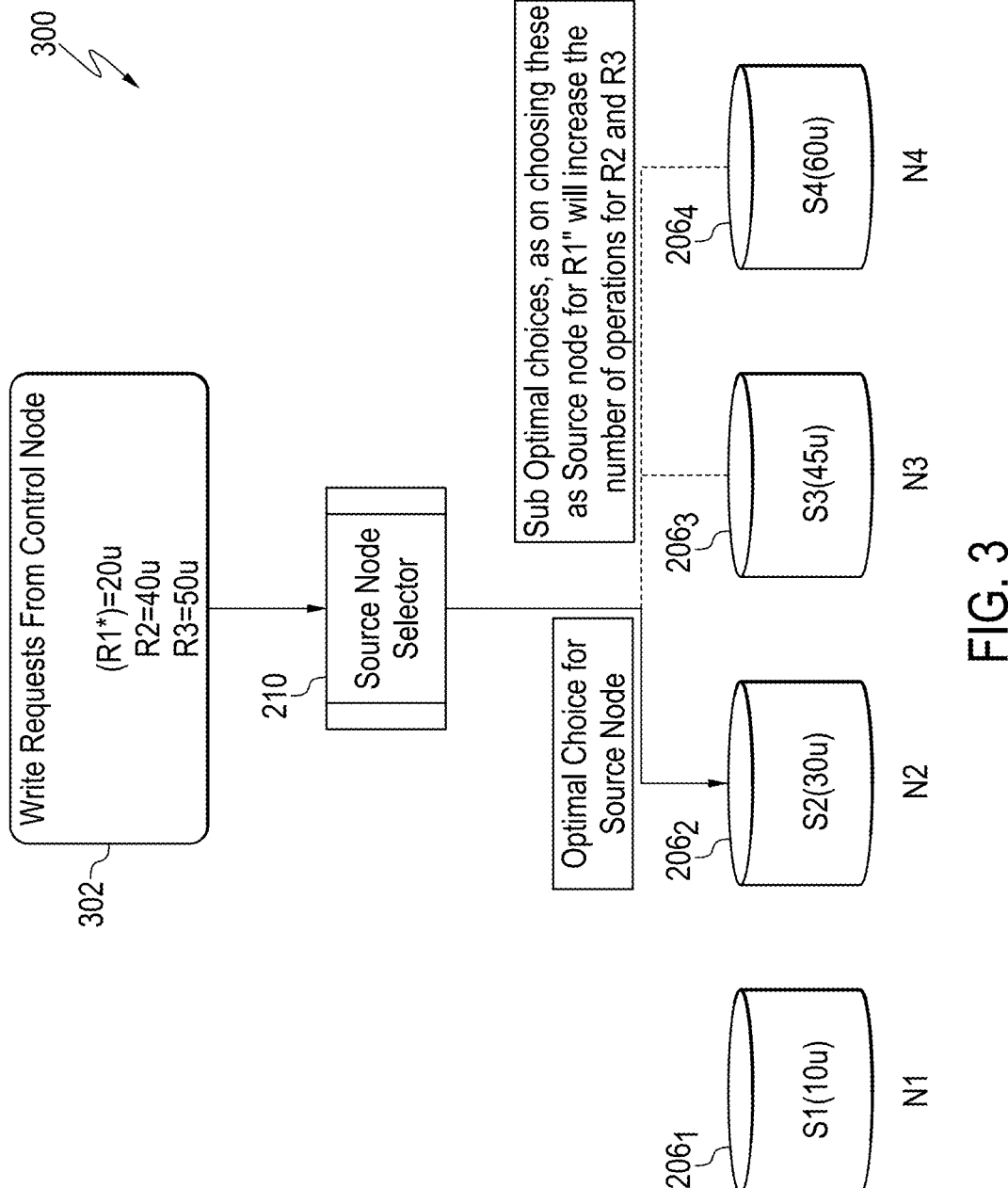

FIG. 3 depicts a source node selection process employing a source node selector, according to at least one aspect of the present disclosure.

Figure 4:
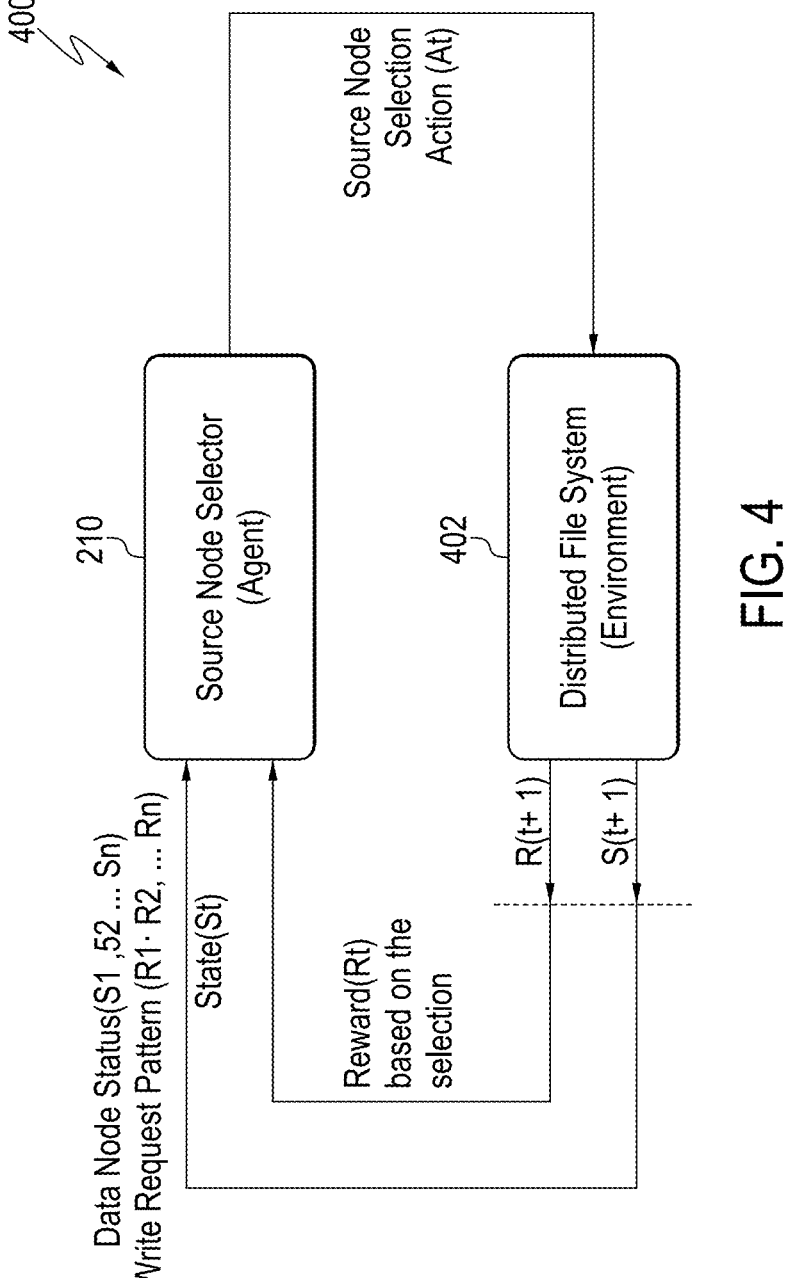

FIG. 4 depicts a source node selector in operation, according to at least one aspect of the present disclosure.

Figure 5:
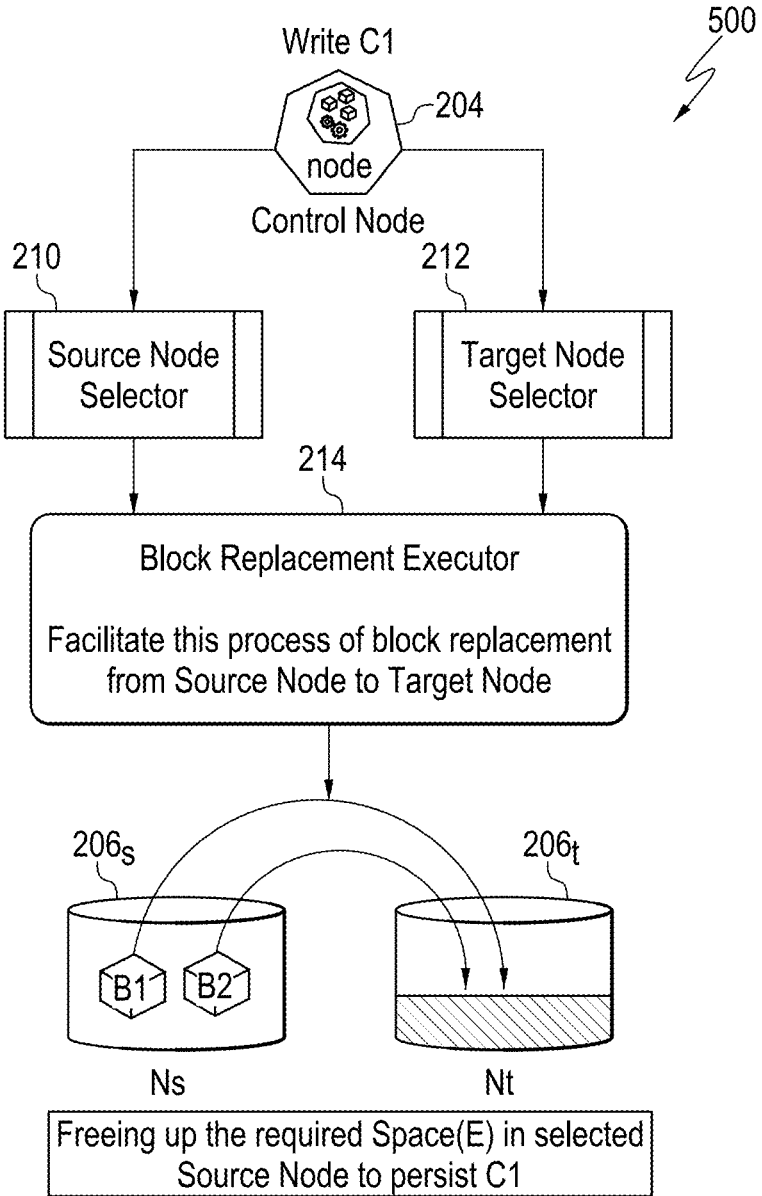

FIG. 5 depicts a block replacement executor in operation, according to at least one aspect of the present disclosure.

Figure 6:
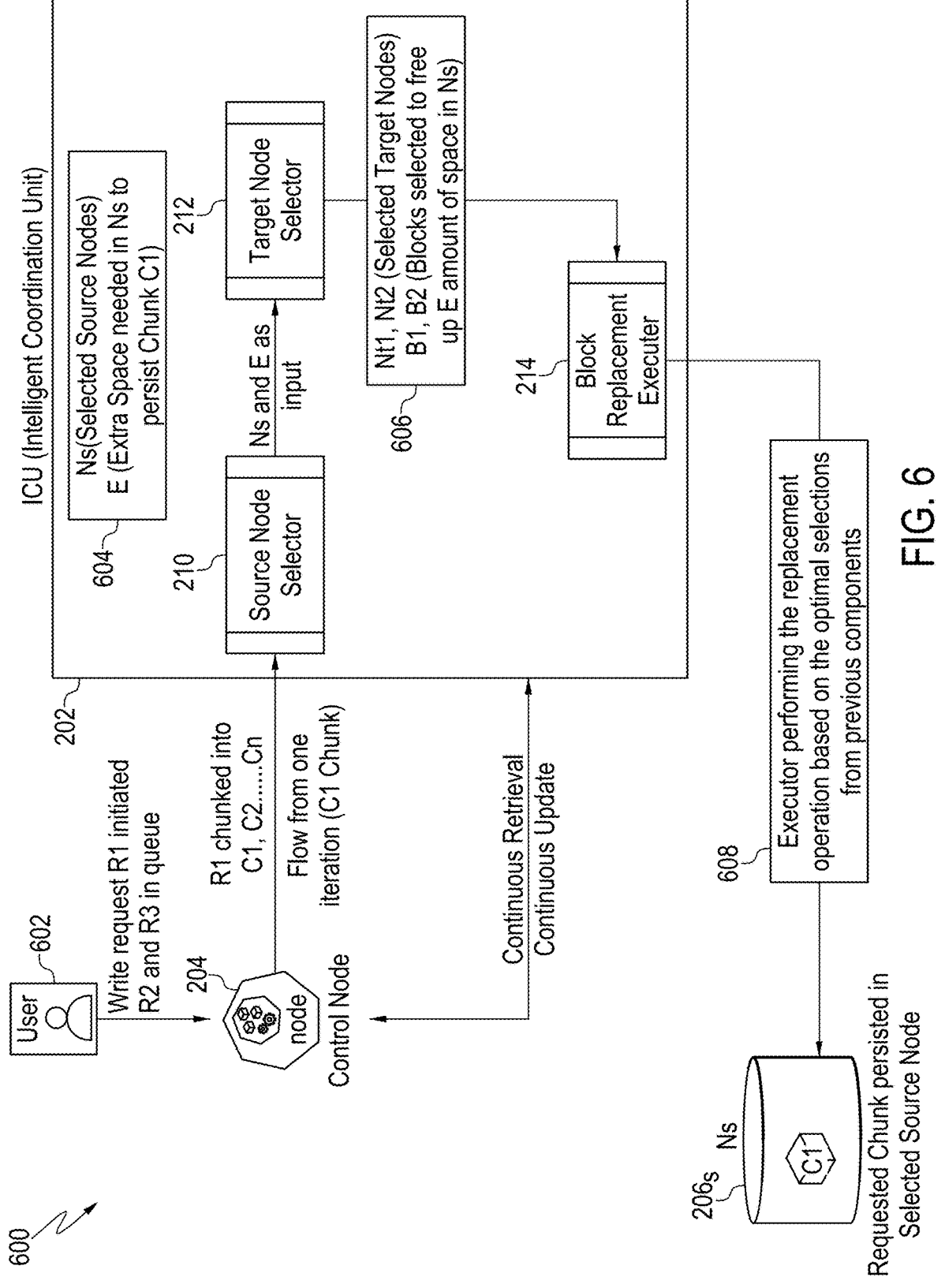

FIG. 6 is a flow diagram for the architecture depicted in FIGS. 2-5, in accordance with at least one aspect of the present disclosure.

FIG. 7 is a method for optimizing memory utilization in distributed file systems, in accordance with at least one aspect of the present disclosure.

Figure 8:
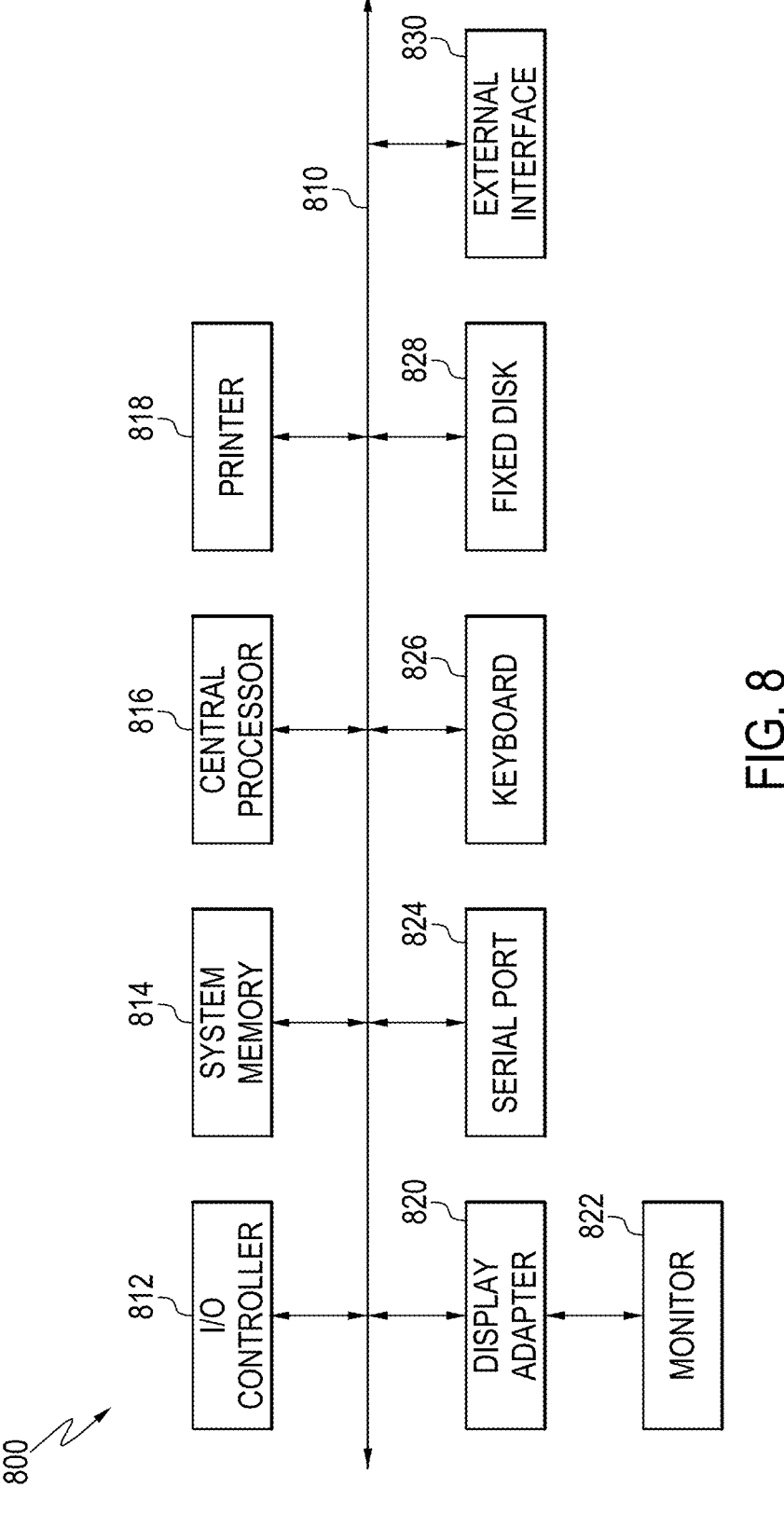

FIG. 8 is a block diagram of a computer apparatus with data processing subsystems or components, according to at least one aspect of the present disclosure.

Figure 9:
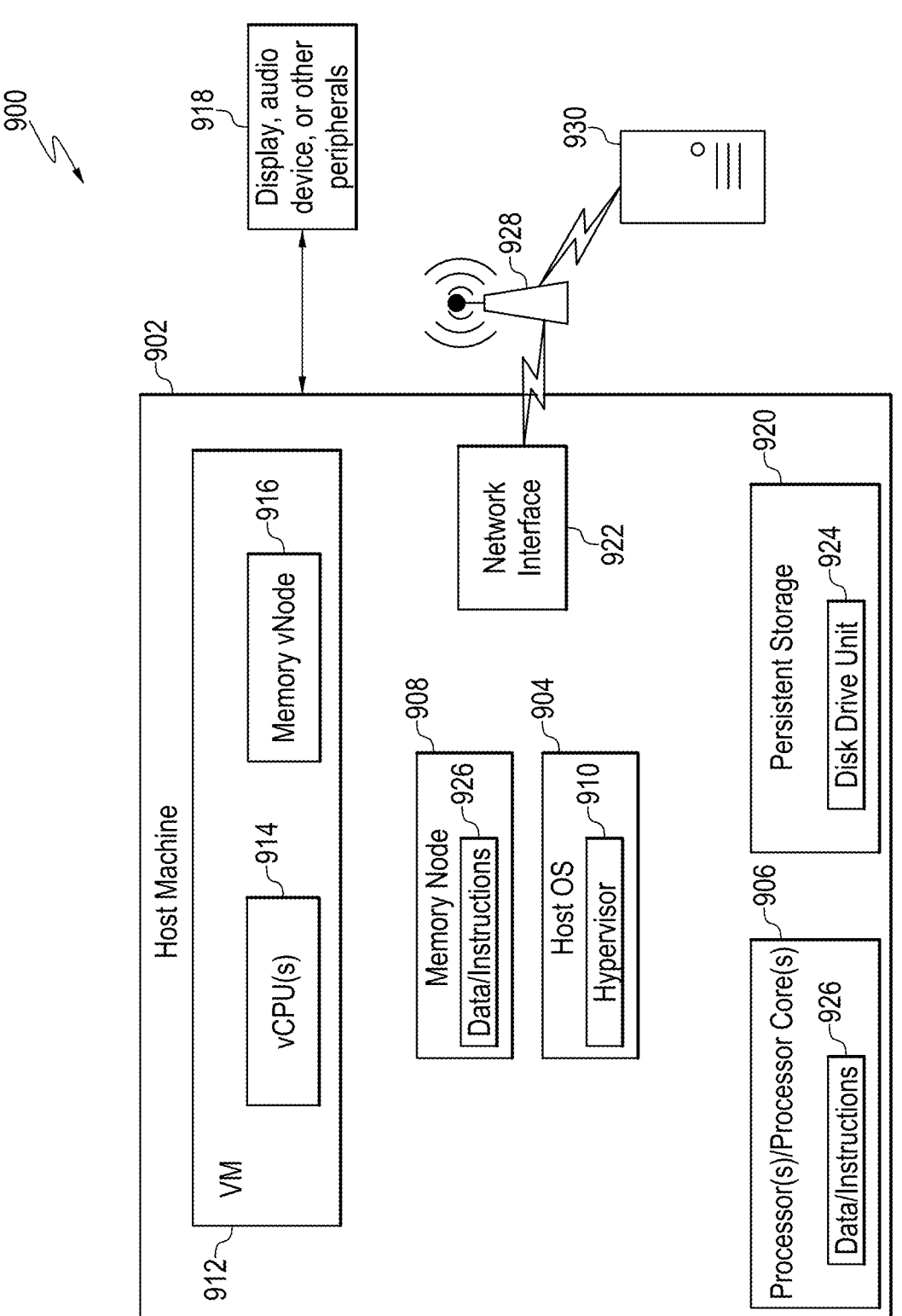

FIG. 9 is a diagrammatic representation of an example computer system that includes a host machine within which a set of instructions to perform any one or more of the methodologies discussed herein may be executed, according to at least one aspect of the present disclosure.

DESCRIPTION

The following disclosure may provide exemplary systems, devices, and methods for conducting a financial transaction and related activities. Although reference may be made to such financial transactions in the examples provided below, aspects are not so limited. That is, the systems, methods, and apparatuses may be utilized for any suitable purpose.

Before discussing specific embodiments, aspects, or examples, some descriptions of terms used herein are provided below.

The terms "communication" and "communicate," as utilized in this context, encompass the activities of sending, receiving, transmitting, facilitating, or otherwise exchanging information, which may include data, signals, messages, instructions, calls, or commands. Communication may occur through direct or indirect pathways and may be executed using wired or wireless methods. For instance, when one entity (such as a device, system, or a component thereof) communicates with another, it means there is a capability for at least one-way information flow between them, whether direct or through intermediary modifications, processing, or relaying of information. To illustrate, communication can be considered to occur even if one entity solely receives data without sending any information back, or if an intermediary entity processes and then conveys the information to the intended recipient. A typical mode of communication may involve sending packets, such as data or network packets containing data, though numerous alternative configurations exist.

A "communication channel" denotes any appropriate conduit through which communication is carried out between two or more parties. These channels may be direct, as in between a payment processing network and a merchant, or may involve various entities. They can be crafted using any suitable communications protocols and may sometimes consist of a "secure communication channel" or "tunnel," established through recognized security methods like mutual authentication and encrypted session keys. Methods for establishing these secure channels can be diverse and are chosen to ensure that sensitive data, such as payment device details, are transferred securely to facilitate transactions. Communication channels, secured or otherwise, may employ wired or wireless connections and can vary in their coverage range.

The designations "computing device" or "computer device" refer to any electronic apparatus configured to engage in communication across a network, either directly or indirectly. Such devices span a spectrum from mobile to stationary forms, including cellular phones (smartphones and feature phones), portable computers, wearable technology (such as smartwatches, smart glasses, and smart clothing), PDAs, and traditional desktop computers. A "computer" explicitly represents a computing device that encompasses essential components for data processing, including a display, processor, memory, input mechanisms, and networking interfaces.

References to "a device," "a server," "a processor," and similar terms should be understood as potentially pointing back to previously mentioned devices, servers, or processors known to perform various steps or functions. These references may also indicate distinct hardware or combinations thereof. Thus, for instance, a "first server" or "first processor" performing one role could very well be a separate or joint server or processor executing another role, as previously described or claimed.

The concept of a "payment network" is characterized as an electronic platform that facilitates the acceptance, conveyance, and processing of transactions made by payment devices for monetary exchanges, goods, or services. It serves as an intermediary for transferring data and funds among various stakeholders such as issuers, acquirers, merchants, and users of payment devices. VisaNet, operated by Visa, Inc., exemplifies such a payment network.

When discussing a "payment processing network," we're referring to a structure that aggregates transaction data, often at preset intervals, from gateway services to commence a settlement process. This process includes recording transactions to the respective accounts of payment devices and reconciling the debit or credit balances for each participating stakeholder. Interlink® is an instance of a payment processing network.

A "processing network" includes any digital system tasked with accepting, transmitting, or processing transactions initiated via devices, ensuring the transfer of information among involved parties, such as issuers, acquirers, merchants, and device users.

The term "providing degraded service" in the context of a payment processing network refers to a state in which one or more criteria for system degradation are met. These criteria encapsulate any condition that causes delayed processing of authorization request messages, including complete failure to process such messages.

"Server computer" generally implies a robust computing system or a cluster of such systems, which can range from large mainframes to minicomputer clusters, or a collection of servers functionally tied together. The server is often associated with an entity like a payment processing network or merchant and is capable of servicing requests from client computers through hardware, software, or both. Some server computers can provide support for payment network cloud services.

The term "system" within this document signifies one or more computing devices—or any combination thereof—that encompass processors, servers, client devices, software applications, components, or their equivalents.

Distributed file systems are useful for managing vast amounts of data across multiple storage nodes. However, current systems often encounter inefficiencies in memory utilization and allocation. These inefficiencies can lead to imbalanced memory use, where some nodes are overburdened while others remain underutilized. The conventional methods are limited in their ability to dynamically adjust to changing data storage patterns, causing delays in data retrieval and suboptimal performance across the network.

Distributed file systems play a pivotal role in the domain of data management across networked systems and allow efficient storage and retrieval of data across multiple nodes. They form the backbone of numerous modern applications, from cloud storage to big data analytics. However, a significant challenge in these systems is the issue of sub-optimal memory usage, which arises when the total available space across nodes ($\Sigma S$, where S represents the available space in each node) is sufficient to accommodate a data write request, whereas no single node has enough space to handle the request individually. For instance, given two data nodes with available space $S_1$ and $S_2$ respectively, a write request of size W, where $W > S_1$ and $W > S_2$, but $W < (S_1 + S_2)$, cannot be fulfilled. This situation leads to sub-optimal space utilization and potential performance degradation in these systems. As a result, there is a need for a novel approach to address this fragmentation, improve space utilization, increase system reliability, and enhance the overall performance of distributed file systems.

To address the issue of sub-optimal memory utilization in distributed file systems, the present disclosure describes a novel architecture introducing a central intelligent entity functioning as an intermediate coordinator between the data nodes and the name node/control node. The central intelligent entity leverages reinforcement learning to execute a block/unit replacement action among the data nodes, reducing the memory holes in the data nodes, optimizing load distribution, and enhancing system performance. Accordingly, storage efficiency is significantly improved, ensuring that distributed file systems can effectively support the growing demands of modern applications.

In various embodiments, the present disclosure provides methods and systems for optimizing memory utilization in a distributed file system. The methods include receiving write requests, monitoring memory usage, determining data block replication states, selecting target nodes, adjusting selection based on historic patterns, data block migration, and rebalancing for optimal utilization. The systems include a control node and an intelligent coordination unit, which includes a source node, a target node, and a block replacement node. In systems where the load can be reasonably predicted or, in other words, the system load follows a certain identifiable pattern, the present disclosure describes optimized unit replacement algorithms.

The present disclosure describes a method for optimizing memory utilization in a distributed file system. The method includes several integrated processes to ensure that a distributed file system operates with enhanced efficiency, reliability, and performance. Initially, the method includes the reception of a write request for the allocation of a data chunk within one or more nodes among the various nodes that constitute the system. Subsequently, the method engages in continuous monitoring of memory consumption pertaining to a dataset, which is systematically fragmented into numerous data blocks distributed among the nodes. This is followed by an assessment to ascertain the current replication status of the data blocks, ensuring redundancy and data integrity. An aspect of the method is the strategic selection of an apt node as the repository for the incoming data chunk. This selection process is rendered dynamic and intelligent by the employment of a reinforcement learning model that refines the node selection by analyzing historical write request patterns to optimize memory allocation and utilization throughout the distributed file system.

The functionality of the disclosed method may be extended by incorporating a migration protocol wherein data blocks are transferred from nodes where memory utilization has surpassed a predetermined threshold to nodes where sufficient memory remains underutilized. This process facilitates an equilibrium in memory allocation, thus enhancing the system's overall efficiency. The method also includes a rebalancing procedure, methodically redistributing data blocks to achieve an optimal state of memory usage among the nodes. In scenarios requiring dynamic adjustment of target node selection, the method adopts strategic measures such as selecting a node with just enough available memory space to house a data block to curtail superfluous memory waste; opting for a node with a considerable amount of unoccupied memory to ensure room for future allocations; or electing the first node identified with adequate memory, expediting the process of locating an appropriate data storage location. Each strategy is tailored to foster a more efficient use of the distributed file system's memory resources.

The present disclosure also describes a system for optimizing memory utilization in a distributed file system. The system includes several integrated processes to ensure that a distributed file system operates with enhanced efficiency, reliability, and performance. The distributed file system for optimizing memory utilization receives write requests in the form of data block write requests from various sources within the distributed network. The system continuously monitors memory utilization metrics for each storage node is conducted to identify current usage patterns and availability. The system determines the replication state of data blocks, ensuring that necessary redundancy levels are maintained to prevent data loss. A reinforcement learning model is employed to select the optimal target node for storing incoming data blocks. This selection is based on historical memory usage patterns and predicted future states. The reinforcement learning model continuously updates its decision-making algorithms based on the historical patterns of memory usage across the nodes. This ensures that the system adapts to changing data storage requirements dynamically. To maintain optimal memory utilization, data blocks may be migrated between nodes. The system triggers data block migrations based on predefined thresholds and real-time memory usage data. Periodic rebalancing processes are executed to ensure that memory usage remains balanced across all nodes, preventing any single node from becoming a bottleneck.

Turning now to the figures, FIG. 1 depicts an illustrative architecture 100 showcasing sub-optimal memory utilization commonly encountered in conventional distributed file systems. Distributed file systems are useful for managing vast amounts of data across multiple storage nodes. However, current systems often encounter inefficiencies in memory utilization and allocation. These inefficiencies can lead to imbalanced memory use, where some nodes are overburdened while others remain underutilized. The conventional methods are limited in their ability to dynamically adjust to changing data storage patterns, causing delays in data retrieval and suboptimal performance across the network.

Distributed file systems play a pivotal role in the domain of data management across networked systems and allow efficient storage and retrieval of data across multiple nodes.

They form the backbone of numerous modern applications, from cloud storage to big data analytics. However, a significant challenge in these systems is the issue of sub-optimal memory usage, which arises when the total available space across nodes ($\Sigma S$, where S represents the available space in each node) is sufficient to accommodate a data write request, whereas no single node has enough space to handle the request individually. For instance, given two data nodes with available space $S_1$ and $S_2$ respectively, a write request of size W, where $W>S_1$ and $W>S_2$, but $W<(S_1+S_2)$, cannot be fulfilled. This situation leads to sub-optimal space utilization and potential performance degradation in these systems. As a result, there is a crucial need for a novel approach to address this fragmentation, improving space utilization, increasing system reliability, and enhancing the overall performance of distributed file systems.

In the scenario depicted in FIG. 1, when a write request 102 (W1) is initiated, a Control Node 104 checks for the available space within the data nodes $106_1$, $106_2$ but as it fails to locate the contiguous space of C1 unit, the write request is denied 108 even though the cumulative memory ($S_1+S_2$) is sufficient to accommodate the chunk C1.

FIG. 2 depicts an illustrative architecture 200 employing an intelligent coordination unit (ICU), according to at least one aspect of the present disclosure. To address the issues described with respect to FIG. 1, the present disclosure provides an architecture employing an ICU 202 between the Control Node 204 and the Data Nodes $206_1$, $206_2$, $206_3$, . . . $206_m$ ($206_1$-$206_m$. The ICU 202 will execute a block/unit replacement algorithm to consolidate free memory in a single data node. Additionally, the ICU 202 will consistently update the Control Node 204 with the revised metadata information.

The ICU 202 comprises various components. In one embodiment, the ICU 202 comprises three parts: a Source Node Selector 210, a Target Node Selector 212, and a Unit/Block Replacement Executor 214. Each component has its unique functionality, collectively contributing to the dynamic and intelligent decision-making capabilities of this architecture.

FIG. 3 depicts a source node selection process 300 employing a source node selector 210, according to at least one aspect of the present disclosure. Components of the architecture shown in FIG. 3 include a source node selector 210 to select a storage node $206_1$, $206_2$, $206_3$, $206_4$ (N1-N4) to process the write request 302 from the control node 204 (FIG. 2). The source node selector 210 entity is responsible for selecting the most optimal source node $206_2$ (N2) for the write operation where the number of block/unit replacement operations can be minimized. The source node selector 302 also dynamically adapts to less optimal source nodes $206_3$, $206_4$ (N3, N4) choices for certain write requests 302, aiming for overall optimization of the system. To achieve this, a reinforcement learning model is deployed, which will learn based on the previous experience and historical write request patterns on the system and hence will select the most optimal source node.

This can be further described by way of the following example where:

TABLE 1

R-> Write Requests size

S-> Free space available in Data Nodes

N-> Data Nodes

TABLE 1-continued

| R*-> Current Request size to Serve<br>Considering S1 < R1*, S2 > R1*, S2 < (R2 and R3), S3 > R2 and S4 > R3 | | |
| --- | --- | --- |
| Write Request Pattern | Data Node Status | Source Node Selection |
| R1* < R2 < R3 | S1 < S2 < S3 < S4 | N2 |

In this scenario, to serve R1* there are multiple choices for source nodes $206_2$, $206_3$ (N2, N3) and $206_3$ (N4) as $S_2$>R1* ($S_3$ and $S_4$ greater than $S_2$) but if the source node selector 210 will choose either of source node $206_2$ (N3) or source node $206_4$ (N4) to serve R1*, later to accommodate R2 and R3, many replacement operations will be needed which in turn will increase the overall cost of this process.

To achieve this, the source node selector 210, which is trained using a Reinforcement Learning Model, will operate based on a State→Action→Reward mechanism. A high-level understanding of this mechanism can be gained using the example described in FIG. 4 below.

FIG. 4 illustrates a system 400 with a source node selector 210 (Agent) in operation in a distributed file system 402 (Environment), according to at least one aspect of the present disclosure. The source node selector 210 acquires a current state (St) including data nodes status ($S_1$, $S_2$, .... Sn) and write request pattern (R1*, R2, .... Rn). A source node selection action (At) is communicated to the distributed file system 402 (Environment), which communicates the next state (St+1) and a reward (Rt) based on the selection back to the source node selector 210. Once the source node is finalized this information will be passed to a target node selector 212 (FIG. 2) using a shared messaging system and this action will trigger the target node selector 212 to begin its operation.

With reference to FIGS. 2-4, the target node selector 212 is a component in the architecture depicted in FIG. 2. Its primary responsibility lies in determining an optimal set of target nodes where the block/unit replacement will occur. This process helps freeing up space on the selected source node $206_1$-$206_m$. In order to make the optimal decision, the target node selector 212 considers several key factors stated below.

Network latency is the distance between the source node $206_1$-$206_m$ and potential target nodes. Network latency is a factor as it will influence the cost of a block replacement operation carried out by the unit replacement executor 214. A shorter distance can mean lower network latency, leading to quicker data transfers and, thus more efficient block replacement operation. Conversely, a longer distance could result in higher network latency, slowing down the data transfer and making the block replacement operation more costly in terms of time and resources. The target node selector 212 aims to minimize network latency by choosing target nodes that are closer to the source node $206_1$-$206_m$, thereby reducing the time taken for the operation and, hence, enhancing the overall system performance.

Identifying blocks/units for replacement is another factor considered by the target node selector 212. In scenarios where the system supports data replication, the target node selector 212 considers the current state of block replications across the system using the two way communication with the control node 204, and the goal is to avoid a situation where, after the block replacement operation, a target node ends up accommodating too many of the same replicated blocks which could lead to an imbalance in the data distribution across the system and potentially overwhelm the target node, affecting its performance.

Dynamic adjustment is another feature of the target node selector 212. Dynamic adjustment is the ability to dynamically adjust the target node selector 212 selection strategy based on historical write request patterns. The target node selector 212 will use the reinforcement learning model, which is explained below, to choose between the most appropriate selection algorithm so that it can adapt to changing system usage patterns and optimize for memory utilization.

The block selection model will start with a standard block selection technique and then evolve to use a more enhanced version of the same using the learning from a reinforcement learning (RL) model.

A best fit algorithm selects the source node $206_1$-$206_m$ with the minimal space that is sufficient to accommodate the data block. The best fit algorithm aims to minimize wasted space.

A worst fit algorithm selects the source node $206_1$-$206_m$ with the maximum space, aiming to leave a larger remainder for future use.

A first fit algorithm selects the first node that has enough space to accommodate the data block. It aims to minimize the time taken to find a suitable node.

By considering the above factors, the target node selector 212 acts as the processing element of the intelligent coordination unit 214 and decides the most optimal set of target nodes for the block replacement operation. The following example illustrates how the target node selector can be employed to achieve the most optimal set of target nodes for the block replacement operation using a RL model, where:

TABLE 2

| R-> Write Requests Size (historical writes)<br>R*->Current Write Request Size<br>Ns-> Selected Source Node (from Previous Component)<br>Ss-> Free Space in Selected Source Node<br>E = R − Ss-> Extra space needed in Ns to persist R<br>N-> Data Nodes<br>S-> Free Space size in Data Nodes<br>B-> Identified blocks for replacement information<br>D-> Distance between the Ns and N (Parameter for Network Latency) |
| --- |

TABLE 2-continued

Assumptions:

1. The target node selector 212 has all the information regarding the replica for Ns
2. S1 > E1, E2 > S3 and E2 < (S2 + S3) as well as E2 < (S2 + S1)
3. k is a positive coefficient
4. D1, D2, and D3 are distance between Ns1 and N1, N2, and N3 respectively
Once a target node is selected and the blocks are moved from the source node to
here, it will not have enough S (free space) to accommodate any of the requests.

| | | State | | | Action | | |
| | | E(R − $S_s$) | S(Free | | | | |
| Write Request Pattern | Source Node Selected | Extra Space Needed | Space in Data Nodes) | D(Distance $N_s$-----N) | Target Node Selected | Blocks Identified In $N_s$ | Reward Score |
| --- | --- | --- | --- | --- | --- | --- | --- |
| R1* < R2 | $N_{s1}, N_{s2}$ | E1* < E2 | S2 > S3 > S1 | D3 > D2 > D1 | N2 | B1 . . . Bp | 0.2k |
| R1* < R2 | $N_{s1}, N_{s2}$ | E1* < E2 | S2 > S3 > S1 | D3 > D2 > D1 | N3 | B1 . . . Bp | 0.6k |
| R1* < R2 | $N_{s1}, N_{s2}$ | E1* < E2 | S2 > S3 > S1 | D3 > D2 > D1 | N1 | B1 . . . Bp | 0.8k |

An explanation of the action→reward mechanism of the target node selector 212 in the above scenario is illustrated by way of the following three cases.

Case1: State $St =$ $$((R1^* < R2), (Ns1, Ns2), (E1^* < E2), (S2 > S3 > S1), (D3 > D2 > D1))$$

$$\text{Action } At = (N2, B1 \ ... \ Bp)$$

$$\text{Reward } Rt = 0.2k$$

In analyzing this state, it can be seen that the target node selector 212 identifies $201_1$, $206_2$, $206_3$ (N1, N2, N3) as potential target nodes, since all of them have the capacity to accommodate R1*. However, if target node $206_2$ (N2) is selected as the target node for R1*, a problem will be encountered with R2 because R2 requires E2 amount of free space for writing its chunk and if target node $206_2$ (N2) is already occupied with R1*, target nodes $206_1$, $206_3$ (N1, N3) will not have sufficient capacity to accommodate the write request for R2 at a later stage leading to a sub optimal selection of a target node and hence increasing the cost of the operation. Accordingly, in Case1 the reward will be a score of 0.2 k.

Case2: State $St =$ $$((R1^* < R2), (Ns1, Ns2), (E1^* < E2), (S3 > S3 > S1), (D3 > D2 > D1))$$

$$\text{Action } At = (N3, B1 \ ... \ Bp)$$

$$\text{Reward } Rt = 0.6k$$

In this particular scenario, the target node selector optimally chooses $206_3$ (N3) as the target node, allowing it to accommodate both R1* and R2. However, if the target node selector 212 had chosen target node $206_1$ (N1) instead of target node $206_3$ (N3), it would have been the most optimal choice. This is because selecting target node $206_1$ (N1) would have minimized network latency, given that D3 is greater than D1. Therefore, while choosing target node $206_3$ (N3) as the target node is a better choice than in Case1, it still represents a sub-optimal decision.

Case3: State $St =$ $$((R1^* < R2), (Ns1, Ns2), (E1^* < E2), (S3 > S3 > S1), (D3 > D2 > D1))$$

$$\text{Action } At = (N1, B1 \ ... \ Bp)$$

$$\text{Reward } Rt = 0.8k$$

This scenario is the most advantageous choice for the target node as it fulfils all requests while keeping operational costs to a minimum (e.g., by reducing network latency). More complex scenarios may arise, for instance, if the system supports replication, the chosen target node might already contain the block selected for the replacement operation. However, these situations will be managed because the target node selector 212 is configured to adapt based on historical results and experiences, utilizing RL.

Once the target node selection and block selection are completed by the target node selector 212, the process is passed to a block replacement executor 214, as described below in conjunction with FIG. 5.

FIG. 5 depicts a system 500 with a block replacement executor 214 in operation, according to at least one aspect of the present disclosure. The block replacement executor 214 is the concluding element of the intelligent coordination unit 202 (FIG. 2). The block replacement executor 214 triggers the replacement operation, taking the source node $206_s$ (Ns), selected target node $206_t$ (Nt), and blocks (B1 . . . . Bp) as inputs. The block replacement executor 214 facilitates the process of block replacement from source node $206_s$ (Ns) to target node 206; (Nt). This process frees up the required space (E) in the selected source node $206_s$ (Ns) to persist C1.

FIG. 6 is a flow diagram 600 for the architecture depicted in FIGS. 2-5, in accordance with at least one aspect of the present disclosure. FIG. 6 depicts the entire processing for one chunk when a write request R1, R2, and R3 in queue is initiated by a User/Client 602. The control node 204 communicates R1 chunked into C1, C2, . . . . Cn chunks to the source node selector 210 of the ICU 202. The control node 204 performs continuous retrieval and updates with the ICU 202. The source node selector 210 provides 602 the selected source node (Ns) and extra space needed in Ns E as input to persist chunk C1 (E) to the target node selector 212. The target node selector 212 provides 606 the selected target nodes Nt1, Nt2 and the selected blocks B1, B2 to free up E amount of space in the source node Ns to the block/unit replacement executor 214 (e.g., replacement block selector). The block/unit replacement executor 214 replaces 608 the block/unit based on the optimal selections from previous components.

The system and method for optimizing memory utilization in a distributed file system 402 (FIG. 4) described above employs a reinforcement learning model than can retain the information gained from historical runs and use that information in some form of reward system to influence/guide its next decisions.

Q-learning is an off-policy reinforcement learning algorithm that seeks to find the best action to take given the current state. Q-learning is considered off-policy because the q-learning function learns from actions that are outside the current policy, like taking random actions, and therefore a policy is not needed. More specifically, q-learning seeks to learn a policy that maximizes the total reward.

The essence of the Q-Learning algorithm is the Bellman equation:

$$Q^{new}(s_t, a_t) \leftarrow \underbrace{Q(s_t, a_t)}_{old\ value} +$$

$$\underbrace{\underset{learning\ rate}{\alpha} \cdot \Big( \underset{reward}{\underline{r_t}} + \underset{discount\ factor}{\gamma} \cdot \underbrace{\underset{a}{max} Q(S_{t+1}, a)}_{estimate\ of\ optimate\ future\ value} - \underset{old\ value}{\underline{Q(S_t, a_t)}} \Big)}_{new\ value\ (temporal\ difference\ target)}$$

where $r_t$ is the reward received when moving from the state $s_t$ to the state $s_{t+1}$, and $\alpha$ is the learning rate ($0 < \alpha \leq 1$).

Note that $Q^{new}$ ($s_t$, $\alpha_t$) is the sum of three factors:

$(1-\alpha)Q(s_t, a_t)$: the current value weighted by the learning rate. Values of the learning rate near to 1 make the changes in Q more rapid.

a $r_t$: the reward $r_t$=r($s_t$, $a_t$) to obtain if action $a_t$ is taken when in state $s_t$ (weighted by learning rate).

ay max Q($s_{t+1}$, $\alpha$): the maximum reward that can be obtained from state $s_{t+1}$ (weighted by learning rate and discount factor).

The previous discussion has delineated the range of potential actions the Source Node Selector (SNS) and the Target Node Selector (TNS) might undertake in various circumstances, along with the methodologies by which these actions may be positively reinforced or rewarded. Drawing from these insights, the system and method described herein develop an optimal decision-making strategy. This strategy is purpose-built to enhance the efficiency of memory utilization within distributed file systems, ensuring that both data distribution and storage are managed in the most effective manner possible.

The system and method for optimizing memory utilization in distributed file systems 402 (FIG. 4) as described herein proffer multiple enhancements when juxtaposed with traditional frameworks. A primary benefit is the effective optimization of 'memory holes' in data nodes. This refined system can adeptly manage an increased volume of write requests, which significantly mitigates fragmentation issues and optimizes memory gaps within the distributed file system.

A further benefit arises from the integration of an intelligent coordination unit. This unit leverages the principles of reinforcement learning to inform its decision-making, thus enabling the selection of optimal operational maneuvers within the file system, enhancing its intelligence and efficacy.

The innovative feature of advanced node selection within the proposed methodology represents another significant leap forward. Through the deployment of two sophisticated algorithms—the Source Node Selector (SNS) and the Target Node Selector (TNS)—the system provides the ability to navigate and alleviate common hindrances such as network latency and the intricacies of maintaining existing data replicas, amongst others, delivering a more streamlined and efficient operational model.

Lastly, the implementation of reinforcement learning is worth highlighting as a pivotal advantage of the current system and method. With its capacity to draw upon and learn from historical data and prior outcomes, the system exhibits an ever-evolving, self-improving quality in its decision-making processes, thereby promoting a continuously advancing memory optimization performance.

FIG. 7 is a method 700 for optimizing memory utilization in distributed file systems, in accordance with at least one aspect of the present disclosure. A method for optimizing memory utilization in a distributed file system includes receiving 702 a write request to store a data chunk in at least one node of a plurality of nodes and monitoring 704 memory usage of a data set across the plurality of nodes in the distributed file system. The data set is partitioned into a plurality of data blocks across the plurality of nodes. The method further includes determining 706 a current state of data block replications across the plurality of nodes, selecting 708 a target node to store the data chunk, and dynamically adjusting 710 selection of the target node based on historical write request patterns according to a reinforcement learning model.

In one embodiment, the method may include migrating data blocks from nodes with memory usage exceeding a predefined threshold to nodes with available memory below the predefined threshold. Additionally, the method may include rebalancing a distribution of data blocks to provide optimal memory utilization across the plurality of nodes.

In another embodiment, dynamically adjusting a selection of a target node may include one or more of: selecting a node with minimal memory space that is sufficient to accommodate a data block and minimize wasted memory space; selecting a node with maximum memory space to provide a larger remainder of unused memory space for future use; or selecting a first node that has sufficient memory space to accommodate a data block to minimize time taken to find a suitable node to store the data chunk.

The optimization process for memory utilization in distributed file systems, as detailed in the accompanying diagrams of FIGS. 2-6, integrates seamlessly with the architecture of the computer apparatus 800 and system 900 outlined in FIGS. 8 and 9. This alignment ensures that the enhancements in memory efficiency are practically applicable and can be effectively executed within the specified computer structures.

FIG. 8 is a block diagram of a computer apparatus 800 with data processing subsystems or components, according to at least one aspect of the present disclosure. The subsystems shown in FIG. 8 are interconnected via a system bus 810. Additional subsystems such as a printer 818, keyboard 826, fixed disk 828 (or other memory comprising computer readable media), monitor 822, which is coupled to a display adapter 820, and others are shown. Peripherals and input/output (I/O) devices, which couple to an I/O controller 812 (which can be a processor or other suitable controller), can be connected to the computer system by any number of means known in the art, such as a serial port 824. For example, the serial port 824 or external interface 830 can be used to connect the computer apparatus to a wide area network such as the Internet, a mouse input device, or a scanner. The interconnection via system bus allows the central processor 816 to communicate with each subsystem and to control the execution of instructions from system memory 814 or the fixed disk 828, as well as the exchange of information between subsystems. The system memory 814 and/or the fixed disk 828 may embody a computer readable medium.

FIG. 9 is a diagrammatic representation of an example computer system 900 that includes a host machine 902 within which a set of instructions to perform any one or more of the methodologies discussed herein may be executed, according to at least one aspect of the present disclosure. In various aspects, the host machine 902 operates as a standalone device or may be connected (e.g., networked) to other machines. In a networked deployment, the host machine 902 may operate in the capacity of a server or a client machine in a server-client network environment, or as a peer machine in a peer-to-peer (or distributed) network environment. The host machine 902 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 900 includes the host machine 902, running a host operating system (OS) 904 on a processor or multiple processor(s)/processor core(s) 906 (e.g., a central processing unit (CPU), a graphics processing unit (GPU), or both), and various memory nodes 908. The host OS 904 may include a hypervisor 910 which is able to control the functions and/or communicate with a virtual machine ("VM") 912 running on machine readable media. The VM 912 also may include a virtual CPU or vCPU 914. The memory nodes 908 may be linked or pinned to virtual memory nodes or vNodes 916. When the memory node 908 is linked or pinned to a corresponding vNode 916, then data may be mapped directly from the memory nodes 908 to the corresponding vNode 916.

All the various components shown in host machine 902 may be connected with and to each other or communicate to each other via a bus (not shown) or via other coupling or communication channels or mechanisms. The host machine 902 may further include a video display, audio device or other peripherals 918 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 920 (also referred to as disk drive unit), and a network interface device 922. The host machine 902 may further include a data encryption module (not shown) to encrypt data. The components provided in the host machine 902 are those typically found in computer systems that may be suitable for use with aspects of the present disclosure and are intended to represent a broad category of such computer components that are known in the art. Thus, the system 900 can be a server, minicomputer, mainframe computer, or any other computer system. The computer may also include different bus configurations, networked platforms, multiprocessor platforms, and the like. Various operating systems may be used including UNIX, LINUX, WINDOWS, QNX ANDROID, IOS, CHROME, TIZEN, and other suitable operating systems.

The disk drive unit 924 also may be a Solid-state Drive (SSD), a hard disk drive (HDD) or other includes a computer or machine-readable medium on which is stored one or more sets of instructions and data structures (e.g., data/instructions 926) embodying or utilizing any one or more of the methodologies or functions described herein. The data/instructions 926 also may reside, completely or at least partially, within the main memory node 908 and/or within the processor(s) 906 during execution thereof by the host machine 902. The data/instructions 926 may further be transmitted or received over a network 928 via the network interface device 922 utilizing any one of several well-known transfer protocols (e.g., Hyper Text Transfer Protocol (HTTP)).

The processor(s) 906 and memory nodes 908 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 902 and that causes the host machine 902 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 902, with each server 930 (or a, least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer-readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer-readable medium, such as RAM, ROM, a magnetic medium such as a hard-drive or a floppy disk, or an optical medium such as a CD-ROM. Any such computer-readable medium may reside on or within a single computational apparatus and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer-readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively, or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively, or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively, or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted being prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method for optimizing memory utilization in a distributed file system, the method comprising:
receiving a write request to store a data chunk in contiguous storage space in a node of a plurality of nodes in the distributed file system;
monitoring memory usage of a data set across the plurality of nodes in the distributed file system, wherein the data set is partitioned into a plurality of data blocks across the plurality of nodes;
determining a current state of data block replications across the plurality of nodes;
selecting a source node, from the plurality of nodes, to store the data chunk;
determining, based on the monitored memory usage and the current state of data block replications, one or more data blocks in the selected source node to be replaced;
determining, based on the monitored memory usage and the current state of data block replications, one or more target nodes, from the plurality of nodes, to receive the replaced data blocks;
executing a block replacement operation that relocates the one or more data blocks from the selected source node to the one or more target nodes to consolidate contiguous free space in the selected source node sufficient to store the data chunk; and
dynamically adjusting at least one of (a) the selecting of the source node or (b) the determining of the one or more target nodes based on historical write request patterns according to a reinforcement learning model.

2. The method of claim 1, wherein the block replacement operation comprises: migrating the one or more data blocks from selected source node with memory usage exceeding a predefined threshold to the one or more target nodes with available memory below the predefined threshold.

3. The method of claim 2, wherein the block replacement operation comprises: rebalancing a distribution of the one or more data blocks to provide optimal memory utilization across the plurality of nodes.

4. The method of claim 1, wherein dynamically adjusting the selecting of the source node comprises selecting a node with minimal memory space that is sufficient to accommodate a data block and minimize wasted memory space.

5. The method of claim 1, wherein dynamically adjusting the selecting of the source node comprises selecting a node with maximum memory space to provide a larger remainder of unused memory space for future use.

6. The method of claim 1, wherein dynamically adjusting the selecting of the source node comprises selecting a first node that has sufficient memory space to accommodate a data block and minimizing time taken to find a suitable node to store the data chunk.

7. The method of claim 1, comprising determining one or more target nodes, from the plurality of nodes, to receive the replaced data blocks based on a best fit algorithm and selecting a source node with minimal space sufficient to accommodate a data block to minimize wasted space.

8. The method of claim 1, comprising determining one or more target nodes, from the plurality of nodes, to receive the replaced data blocks based on a worst fit algorithm and selecting a source node with maximum space to leave a larger remainder for future use.

9. The method of claim 1, comprising determining one or more target nodes, from the plurality of nodes, to receive the replaced data blocks based on a first fit algorithm and selecting a first node that has sufficient space to accommodate a data block to minimize time taken to find a suitable node.

10. A system for optimizing memory utilization in a distributed file system comprising a processor and a non-transitory computer-readable medium coupled to the processor, the non-transitory computer-readable medium storing instructions that, when executed by a processor, cause the processor to:

receive a write request to store a data chunk in contiguous storage space in a node of a plurality of nodes in the distributed file system;

monitor memory usage of a data set across the plurality of nodes in the distributed file system, wherein the data set is partitioned into a plurality of data blocks across the plurality of nodes;

determine a current state of data block replications across the plurality of nodes;

select a source node, from the plurality of nodes, to store the data chunk;

determine, based on the monitored memory usage and the current state of data block replications, one or more data blocks in the selected source node to be replaced;

determine, based on the monitored memory usage and the current state of data block replications, one or more target nodes, from the plurality of nodes, to receive the replaced data blocks;

execute a block replacement operation that relocates the one or more data blocks from the selected source node to the one or more target nodes to consolidate contiguous free space in the selected source node sufficient to store the data chunk; and dynamically adjust selection of at least one of (a) the selecting of the source node or (b) the determining of the one or more target nodes based on historical write request patterns according to a reinforcement learning model.

11. The system of claim 10, wherein the non-transitory computer-readable medium stores additional instructions that, when executed by the processor, cause the processor to migrate the one or more data blocks from selected source node with memory usage exceeding a predefined threshold to the one or more target nodes with available memory below the predefined threshold as part of the block replacement operation.

12. The system of claim 10, wherein the non-transitory computer-readable medium stores additional instructions that, when executed by the processor, cause the processor to rebalance a distribution of the one or more data blocks to provide optimal memory utilization across the plurality of nodes as part of the block replacement operation.

13. The system of claim 10, wherein the non-transitory computer-readable medium stores additional instructions that, when executed by the processor, cause the processor to:

determine one or more target nodes, from the plurality of nodes, to receive the replaced data blocks based on a best fit algorithm and selecting a source node with minimal space sufficient to accommodate a data block to minimize wasted space;

determine one or more target nodes, from the plurality of nodes, to receive the replaced data blocks based on a worst fit algorithm and selecting a source node with maximum space to leave a larger remainder for future use; or determine one or more target nodes, from the plurality of nodes, to receive the replaced data blocks based on a first fit algorithm and selecting a first node that has sufficient space to accommodate a data block to minimize time taken to find a suitable node.

* * * * *